United States Patent
Tang

(10) Patent No.: US 12,557,079 B2
(45) Date of Patent: Feb. 17, 2026

(54) METHODS AND APPARATUSES FOR DETERMINING AND ALLOCATING RESOURCES, AND TERMINAL AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 438 days.

(21) Appl. No.: 17/170,650

(22) Filed: Feb. 8, 2021

(65) Prior Publication Data

US 2021/0160867 A1 May 27, 2021

Related U.S. Application Data

(63) Continuation of application No. PCT/CN2018/105848, filed on Sep. 14, 2018.

(51) Int. Cl.
*H04W 72/0446* (2023.01)
*H04W 72/20* (2023.01)

(52) U.S. Cl.
CPC ....... *H04W 72/0446* (2013.01); *H04W 72/20* (2023.01)

(58) Field of Classification Search
CPC .......................... H04W 72/0446; H04W 72/20
See application file for complete search history.

(56) References Cited

U.S. PATENT DOCUMENTS

| | | | |
|---|---|---|---|
| 11,632,795 B2* | 4/2023 | Kim | H04W 72/0446 370/329 |
| 2016/0249244 A1* | 8/2016 | Xia | H04L 5/0057 |
| 2018/0027589 A1 | 1/2018 | Yang | |
| 2018/0227936 A1 | 8/2018 | Yerramalli et al. | |
| 2019/0159147 A1* | 5/2019 | Ryu | H04W 72/0446 |
| 2019/0230644 A1* | 7/2019 | Cheng | H04W 72/0446 |
| 2019/0253200 A1* | 8/2019 | Salem | H04W 74/0808 |
| 2021/0014895 A1* | 1/2021 | Wu | H04L 27/2656 |
| 2021/0168780 A1* | 6/2021 | Li | H04W 74/006 |

(Continued)

FOREIGN PATENT DOCUMENTS

| | | |
|---|---|---|
| CN | 105898770 A | 8/2016 |
| EP | 3820231 A1 | 5/2021 |
| JP | 2019523593 A | 8/2019 |

(Continued)

OTHER PUBLICATIONS

Examination Report for European Application No. 18933309.9 issued Sep. 2, 2022. 5 pages.

(Continued)

*Primary Examiner* — Jasper Kwoh
(74) *Attorney, Agent, or Firm* — PERKINS COIE LLP

(57) ABSTRACT

Methods and apparatuses for determining and allocating resources are provided. The method for determining resources includes: the terminal determines a target sending time unit of a target channel, and determines resources of the target channel according to the relationship of the target sending time unit of the target channel and a first time period.

18 Claims, 3 Drawing Sheets

(56) References Cited

U.S. PATENT DOCUMENTS

2022/0196780 A1* 6/2022 Dwivedi .............. H04W 72/51

FOREIGN PATENT DOCUMENTS

| WO | 2016119452 A1 | 8/2016 |
|----|---------------|--------|
| WO | 2017097581 A1 | 6/2017 |
| WO | 2017170809 A1 | 10/2017 |
| WO | 2018017187 A1 | 1/2018 |
| WO | 2018081181 A1 | 5/2018 |
| WO | 2019158041 A1 | 8/2019 |

OTHER PUBLICATIONS

First Office Action for Chinese Application No. 202110167738.7 issued Jul. 27, 2022. 11 pages with English translation.
Examination Report No. 1 for Australian Application No. 2018441184 issued Oct. 14, 2021. 3 pages.
EPO, Extended European Search Report for European Patent Application No. 18933309.9. Mail Date: Jun. 25, 2021. 13 pages.
Huawei et al. "HARQ enhancements in NR unlicensed" R1-1808063; 3GPP TSG RAN WG1 Meeting #94; Gothenburg, Sweden; Aug. 20-24, 2018. 8 pages.
Vivo "Discussion on HARQ operation for NR-U" R1-1808239; 3GPP TSG RAN WE1 Meeting #94; Gothenburg, Sweden, Aug. 20-24, 2018. 3 pages.
Examination Report for European Application No. 18933309.9 issued Jan. 24, 2023. 7 pages.
Notice of Reasons for Refusal for Japanese Application No. 2021-537453 issued May 13, 2022. 10 pages with English translation.
Qualcomm "Study on NR-based Access to Unlicensed Spectrum" RP-181704; 3GPP TSG RAN Meeting #81; Gold Coast, Australia; Sep. 10-13, 2018. 8 pages.
Sony "Considerations on HARQ enhancements for NR unlicensed operation" R1-1808337; 3GPP TSG RAN WG1 Meeting #94; Gothenburg, Sweden; Aug. 20-24, 2018. 2 pages.
Interdigital Inc. "3GPP TSG RAN WG1 Meeting #94 R1-1809091", On HARQ Enhancements for NR-U, Aug. 11, 2018, p. 5, lines 10-20.
OPPO. "3GPP TSG RAN WG1 Meeting #93 R1-1806854", HARQ Procedure on NR-U, May 12, 2018.
International Search Report dated May 29, 2019 cited in PCT/CN2018/105848.
Decision of Refusal for Japanese Application No. 2021-537453 issued Nov. 25, 2022. 7 pages with English translation.
The Second Office Action for Chinese Application No. 202110167738.7 issued Oct. 31, 2022. 11 pages with English translation.
Examination Report for European Application No. 18933309.9 issued Mar. 11, 2022. 7 pages.
Examination Report for Indian Application No. 202117005288 issued Jan. 20, 2022. 5 pages with English translation.
Examination Report No. 2 for Australian Application No. 2018441184 issued Feb. 4, 2022. 3 pages.
Examination Report of the EP application No. 18933309.9, issued on Jun. 15, 2023. 6 pages.
Reconsideration Report by Examiner before Appeal of the JP application No. 2021-537453, issued on Apr. 28, 2023. 7 pages with English translation.

* cited by examiner

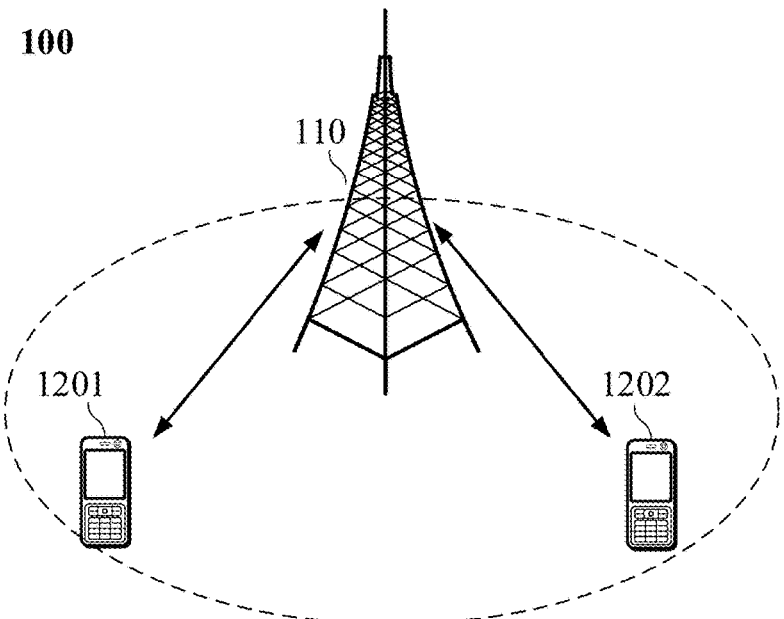

FIG. 1

```
A terminal determines a target transmission time unit of a target channel, and    201
   determines resources of the target channel according to the relationship
  between the target transmission time unit of the target channel and a first
                                time period
```

FIG. 2

```
     A base station allocates a first resource set or a second resource set to a
  terminal, wherein the first resource set or the second resource set is used for    301
      determining, by the terminal, resources of a target channel according to a
  relationship between a target transmission time unit of the target channel and
                                 a first time period
```

FIG. 3

METHODS AND APPARATUSES FOR DETERMINING AND ALLOCATING RESOURCES, AND TERMINAL AND NETWORK DEVICE

CROSS-REFERENCE TO RELATED APPLICATION

The present application is a continuation application of International PCT Application No. PCT/CN2018/105848, having an international filing date of Sep. 14, 2018, the entire content of which is hereby incorporated by reference.

TECHNICAL FIELD

Embodiments of the present disclosure relate to the field of mobile communication technology, in particular to a method and an apparatus for determining and configuring resources, a terminal, and a network device.

BACKGROUND

In a New Radio (NR) system, after receiving a Physical Downlink Shared CHannel (PDSCH) sent by a base station, a terminal sends Hybrid Automatic Repeat reQuest (HARQ) feedback information to the base station. The HARQ feedback information is carried in a Physical Uplink Control CHannel (PUCCH), and a slot in which the PUCCH is located is determined by PDSCH-to-HARQ-timing carried in a Physical Downlink Control CHannel (PDCCH) for scheduling the PDSCH. A PUCCH resource of the HARQ feedback information is determined by PUCCH resource indication information carried in the PDCCH.

In a NR Unlicensed (NR-U) system, before transmitting a PUCCH, the terminal needs to follow the principle of "Listen-Before-Talk" (LBT), that is, a channel state on unlicensed spectrum is detected, and a PUCCH can be transmitted only when the channel state is an idle state, otherwise, the PUCCH cannot be transmitted. However, the limitation on PDCCH transmission opportunities will lead to the following problem: if LBT fails, transmission delay and throughput performance will be affected.

SUMMARY

Embodiments of the present disclosure provide a method and an apparatus for determining and configuring resources, a terminal, and a network device.

A method for determining resources provided by an embodiment of the present disclosure includes: determining, by a terminal, a target transmission time unit of a target channel, and determining resources of the target channel according to a relationship between the target transmission time unit of the target channel and a first time period.

A method for configuring resources provided by an embodiment of the present disclosure includes: configuring, by a base station, a first resource set or a second resource set to a terminal, wherein the first resource set or the second resource set is used for determining, by the terminal, resources of a target channel according to a relationship between a target transmission time unit of the target channel and a first time period.

An apparatus for determining resources provided by an embodiment of the present disclosure includes a first determining unit and a second determining unit.

The first determining unit is configured to determine a target transmission time unit of a target channel.

The second determining unit is configured to determine resources of the target channel according to a relationship between the target transmission time unit of the target channel and a first time period.

An apparatus for configuring resources provided by an embodiment of the present disclosure includes a configuring unit.

The configuring unit is configured to configure a first resource set or a second resource set to a terminal, wherein the first resource set or the second resource set is used for determining, by the terminal, resources of a target channel according to a relationship between a target transmission time unit of the target channel and a first time period.

A terminal provided by an embodiment of the present disclosure includes: a processor and a memory. The memory is configured to store a computer program, and the processor is configured to call and run the computer program stored in the memory to perform the method for determining resources.

A network device provided by an embodiment of the present disclosure includes a processor and a memory. The memory is configured to store a computer program, and the processor is configured to call and run the computer program stored in the memory to perform the method for configuring resources.

A chip provided by an embodiment of the present disclosure is configured to implement the method for determining resources or the method for configuring resources.

Specifically, the chip includes a processor configured to call and run a computer program from a memory to cause a device in which the chip is installed to perform the method for determining resources or the method for configuring resources.

A computer readable storage medium provided by an embodiment of the present disclosure is configured to store a computer program that causes a computer to perform the method for determining resources or the method for configuring resources.

A computer program product provided by an embodiment of the present disclosure includes computer program instructions, which cause a computer to perform the method for determining resources or the method for configuring resources.

A computer program provided by an embodiment of the present disclosure, when run on a computer, causes the computer to perform the method for determining resources or the method for configuring resources.

By the above technical solutions, in a NR-U system, different resource configurations are adopted for different PUCCH transmission scenarios, which reduces the influence caused by a LBT failure, ensures the success probability of PUCCH channel transmission and improves the system performance.

BRIEF DESCRIPTION OF DRAWINGS

The drawings described herein are used to provide a further understanding of the present disclosure and form a part of the present disclosure. Illustrative embodiments of the present disclosure and the description thereof are used to explain the present disclosure and do not constitute improper limitation on the present disclosure. In the drawings:

FIG. 1 is a schematic diagram of an architecture of a communication system according to an embodiment of the present disclosure.

FIG. 2 is a schematic flowchart of a method for determining resources according to an embodiment of the present disclosure.

FIG. 3 is a schematic flowchart of a method for configuring resources according to an embodiment of the present disclosure.

DETAILED DESCRIPTION

Figure 4:
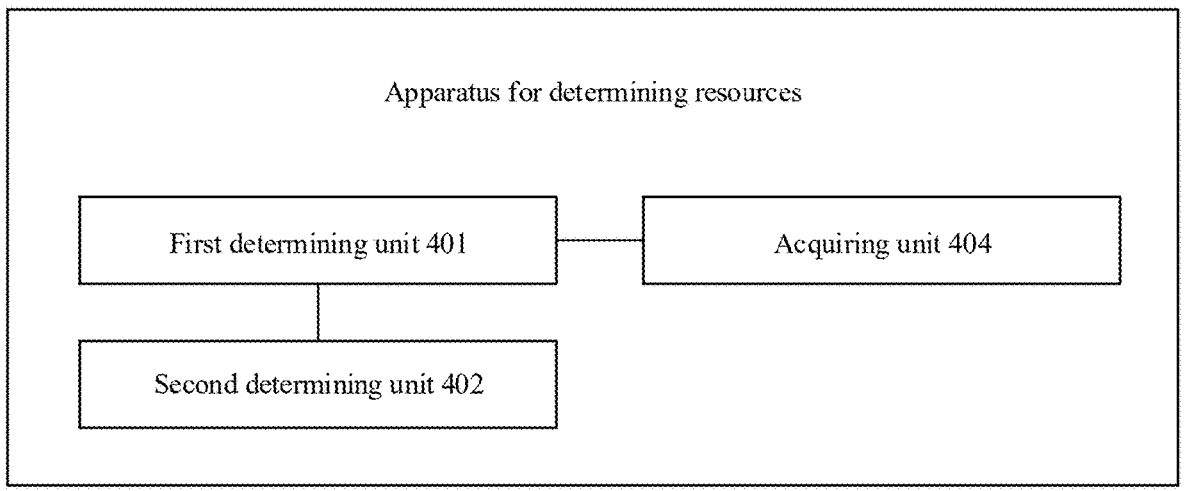
FIG. 4 is a schematic diagram of a structure of an apparatus for determining resources according to an embodiment of the present disclosure.

The technical solution in embodiments of the present disclosure will be described below with reference to the drawings in embodiments of the present disclosure. It is apparent that the embodiments described are just some embodiments of the present disclosure, but not all embodiments of the present disclosure. According to the embodiments of the present disclosure, all other embodiments achieved by a person of ordinary skills in the art without paying an inventive effort are within the protection scope of the present disclosure.

The technical solutions of the embodiments of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, LTE Time Division Duplex (TDD), a Universal Mobile Telecommunication System (UMTS), a Worldwide Interoperability for Microwave Access (WiMAX) communication system, or a 5G system, etc.

Illustratively, a communication system 100 applied in an embodiment of the present disclosure is as shown in FIG. 1. The communication system 100 may include a network device 110, and the network device 110 may be a device that communicates with a terminal such as the terminal 1201 and/or the terminal 1202 (or referred to as a communication terminal, or a terminal). The network device 110 may provide communication coverage for a specific geographical area, and may communicate with terminals located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 further includes at least one terminal, such as the terminal 1201 and/or the terminal 1202 located within the coverage area of the network device 110. As used herein, the term "terminal" includes, but is not limited to, a device configured to receive/send a communication signal via a wired line, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a DVB-H network, a satellite network, an AM-FM broadcast transmitter; and/or another terminal; and/or an Internet of Things (IoT) device. A terminal configured to communicate via a wireless interface may be referred to as a "wireless communication terminal", a "wireless terminal" or a "mobile terminal". Examples of the mobile terminal include, but not limited to, a satellite or cellular telephone, a Personal Communications System (PCS) terminal capable of combining a cellular wireless telephone and data processing, faxing, and data communication abilities, a PDA that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal may be referred to as an access terminal, User Equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal in a 5G network, or a terminal in a future evolved PLMN, etc.

Optionally, Device to Device (D2D) communication may be performed between the terminal 1201 and the terminal 1202.

Optionally, a 5G system or a 5G network can also be called a New Radio (NR) system or a NR network.

FIG. 1 shows one network device and two terminals as an example. Optionally, the communication system 100 may include multiple network devices, and other quantities of terminals may be included within the coverage area of each network device, and this is not limited in the embodiments of the present disclosure.

Optionally, the communication system 100 may further include other network entities such as a network controller and a mobile management entity, which is not limited in the embodiments of the present disclosure.

It should be understood that devices with communication function in a network/system may be referred to as communication devices in the embodiments of the present disclosure. Taking the communication system 100 shown in FIG. 1 as an example, communication devices may include a network device 110 and a terminal, such as the terminal 1201 and the terminal 1202, which have communication function, and the network device 110, the terminal 1201 and the terminal 1202may be the specific devices described above, which will not be described here again. The communication devices may also include other devices in the communication system 100, e.g., other network entities such as a network controller or a mobile management entity, which is not limited in the embodiments of the present disclosure.

It should be understood that the terms "system" and "network" are often used interchangeably here. The term "and/or" herein is merely an association relationship describing associated objects, indicating that there may be three relationships, for example, A and/or B may indicate three cases: A alone, A and B, and B alone. In addition, the symbol "/" herein generally indicates that objects before and after the symbol "/" have an "or" relationship.

In order to facilitate understanding of the technical solutions of the embodiments of the present disclosure, the related technologies of the embodiments of the present disclosure will be described below.

Unlicensed spectrum is a spectrum classified by countries and regions that can be used for communication of radio devices. This spectrum is generally regarded as shared spectrum, that is, communication devices in different communication systems can use this spectrum without applying for exclusive spectrum authority from the government, as long as they meet the regulatory requirements set by countries or regions on this spectrum. In order to enable various communication systems using unlicensed spectrum for wireless communication to coexist amicably on this spectrum, some countries or regions have stipulated the legal requirements that must be met for using unlicensed spectrum. For example, in Europe, the communication devices follow the LBT principle, that is, before transmitting signals on a channel of the unlicensed spectrum, the communication devices need to conduct channel listening first, and the communication devices can transmit signals only when the result of channel listening is that the channel is idle. If the result of channel listening by the communication devices on an unlicensed spectrum channel is that the channel is busy, the communication devices cannot transmit signals. In addition, in order to ensure fairness, in one transmission, the duration in which the communication devices use an unlicensed spectrum channel for signal transmission cannot exceed the Maximum Channel Occupation Time (MCOT).

A Long Term Evolution (LTE) system-based Licensed-Assisted Access (LAA-LTE) system provides services to a terminal based on carrier aggregation, with a carrier on licensed spectrum as a primary carrier and a carrier on unlicensed spectrum as a secondary carrier. In the LAA-LTE system, the primary carrier may be used for ensuring an initial access of the terminal and the transmission performance of some key services, while the secondary carrier on unlicensed spectrum may be used for transmitting non-critical big data services of the terminal. In the NR system, it is also planned to introduce NR-U technology for communication on unlicensed spectrum using the NR technology.

In a NR system, a slot where a PUCCH carrying HARQ feedback information (such as HARQ-ACK information or HARQ-NACK information) is located is determined by PDSCH-to-HARQ-timing carried in a PDCCH for scheduling a PDSCH. For example, PDSCH-to-HARQ-timing=5, if a terminal receives a PDSCH in slot n, then the terminal feeds back HARQ-ACK information on slot n+5, wherein the maximum value of PDSCH-to-HARQ-timing is 15. Further, a PUCCH resource for feeding back HARQ-ACK information is determined by PUCCH resource indication information carried in the PDCCH.

In a NR-U system, before transmitting a PUCCH, a terminal needs to detect channel state on unlicensed spectrum, and can transmit a PUCCH only when the channel state is an idle state, otherwise it cannot transmit a PUCCH. In order to reduce the influence on transmission delay and throughput performance caused by a LBT failure, in a technical solution of an embodiment of the present disclosure, transmission opportunities of PUCCH are increased (including increasing the transmission opportunities in time domain or frequency domain). In addition, a base station may share Channel Occupation Time (COT) of a downlink channel with uplink transmission. In this case, LBT may not be performed for uplink transmission in the COT, or uplink transmission may be started only after one shot LBT is performed.

In a NR-U technology, the transmission slot of PUCCH is indicated by PDSCH-to-HARQ-timing, and the transmission slot of PUCCH may be within or outside the current COT. In these two cases, the types of LBT that need to be performed for PUCCH transmission may be different, and the success probabilities of obtaining uplink channels are also different, so it is necessary to configure transmission opportunities of PUCCH for the two cases respectively.

FIG. 2 is a schematic flowchart of a method for determining resources according to an embodiment of the present disclosure. As shown in FIG. 2, the method for determining resources includes act 201.

In act 201, a terminal determines a target transmission time unit of a target channel, and determines resources of the target channel according to a relationship between the target transmission time unit of the target channel and a first time period.

In an embodiment of the present disclosure, the terminal may be any device that can communicate with a network, such as a mobile phone, a tablet computer, a vehicle-mounted terminal, and a wearable terminal.

In an embodiment of the present disclosure, the target channel is an uplink control channel (such as a PUCCH), which is used for carrying HARQ feedback information (such as HARQ-ACK information or HARQ-NACK information). For example, a base station transmits a PUSCH to a terminal, and if the terminal successfully receives the PUSCH, it will send HARQ-ACK information to the base station to notify the base station that the terminal successfully receives the PUSCH; and if the terminal does not receive the PUSCH successfully, it will send HARQ-NACK information to the base station to notify the base station that the terminal does not receive the PUSCH successfully, so that the base station retransmits the previous PUSCH to the terminal.

In an embodiment of the present disclosure, the target transmission time unit of the target channel refers to a planned transmission time unit of the target channel. The terminal determines the target transmission time unit of the target channel in the following way, i.e., the terminal obtains first control information including first indication information for indicating a time offset of the target transmission time unit of the target channel relative to a receiving time unit of a first channel; and the terminal determines the target transmission time unit of the target channel based on the receiving time unit of the first channel and the time offset, wherein the first channel is a downlink data channel.

For example, the target channel is a target PUCCH, which refers to a PUCCH for carrying HARQ feedback information, the target transmission time unit is a target transmission slot, and the target transmission slot of the target PUCCH is indicated by PDSCH-to-HARQ-timing, which is carried in a PDCCH for scheduling a PDSCH. The terminal receives a PDCCH, acquires DCI from the PDCCH, further acquires PDSCH-to-HARQ-timing information from the DCI, and determines the target transmission slot based on the PDSCH-to-HARQ-timing information. Here, PDSCH-to-HARQ-timing represents a time offset between the receiving slot of the PDSCH and the target transmission slot of the target PUCCH, e.g., PDSCH-to-HARQ-timing=3, the terminal receives the PDSCH in slot n, then the target transmission slot of the target PUCCH is slot n+3.

In an embodiment of the present disclosure, the first time period refers to a COT that the terminal can use (i.e., occupy) currently, that is, the uplink transmission of the terminal in the first time period may be performed without LBT or only after one shot LBT. The first time period may be obtained in the following two manners.

In Manner 1, the first time period is COT obtained by a base station.

In Manner 2, the first time period is COT obtained by a terminal.

For example, before a base station transmits a PDSCH to a terminal, LBT needs to be performed. If LBT succeeds, COT is obtained for transmitting a PDSCH. The base station may perform downlink transmission in the COT. The base station may share the COT of the PDSCH with the terminal for uplink transmission. In this case, the uplink transmission of the terminal in the COT may be performed without LBT or only after one shot LBT.

In another example, before the terminal transmits a PDCCH, LBT needs to be performed. If LBT succeeds, COT is obtained for transmitting a PDCCH. The uplink transmission of the terminal in this COT may be performed without LBT or only after one shot LBT.

In an embodiment of the present disclosure, since the first time period refers to COT that the terminal can use (i.e., occupy) currently, whether the target transmission time unit of the target channel is within the first time period leads to different success probabilities of the terminal in obtaining an uplink control channel, and it is needed to configure the transmission opportunities of the uplink control channel for the two cases respectively.

In Case 1, if the target transmission time unit of the target channel is within the first time period, it is determined that resources of the target channel belong to a first resource set.

Here, that the target transmission time unit of the target channel is within the first time period includes: the target transmission time unit of the target channel belongs to the COT.

In Case 2, if the target transmission time unit of the target channel is outside the first time period, it is determined that resources of the target channel belong to a second resource set.

Here, that the target transmission time unit of the target channel is outside the first time period includes: the target transmission time unit of the target channel does not belong to the COT.

For the above Case 2, the target transmission time unit of the target channel may be in other COTs. Here, other COTs refer to the COTs that the terminal cannot use (i.e., occupy) currently, and other COTs may be the COTs obtained by performing LBT by other devices (terminals or network devices). Without being limited to this, the target transmission time unit of the target channel may alternatively be in a non-COT. Here, the non-COT refers to a COT that is not used (i.e., occupied) by any device.

In an embodiment of the present disclosure, if the target transmission time unit of the target channel belongs to the COT, the resources of the target channel belong to the first resource set. If the target transmission time unit of the target channel does not belong to the COT, the resources of the target channel belong to the second resource set. The number of resources contained in the second resource set is greater than or equal to the number of resources contained in the first resource set. That is, under the condition that the target transmission time unit of the target channel does not belong to the COT, there are more transmission opportunities of an uplink control channel, so that the probability of the terminal's successfully performing LBT on the uplink control channel can be increased.

In an embodiment of the present disclosure, the first resource set includes resources for transmitting the target channel in the target transmission time unit.

In an embodiment of the present disclosure, the second resource set is different from the first resource set, and the second resource set and the first resource set may have overlapping resources or may be completely different. Further, the second resource set may include resources for transmitting the target channel in the target transmission time unit, or may not include resources for transmitting the target channel in the target transmission time unit.

In an embodiment, the first resource set and the second resource set have at least one identical resource. The at least one identical resource includes a resource for transmitting the target channel in the target transmission time unit.

In an embodiment, the first resource set is configured by a first higher layer signaling and/or first control information, and the second resource set is configured by a second higher layer signaling and/or second control information.

For example, the first resource set is configured by a first higher layer signaling and first control information. The first higher layer signaling includes configuration information of a third resource set. The first control information includes indication information of at least one resource in the third resource set. The terminal determines the first resource set based on the first higher layer signaling and the first control information. Further, the third resource set is a resource set of an uplink control channel.

Here, the first higher layer signaling may be a Radio Resource Control (RRC) signaling, the first control information may be Downlink Control Information (DCI), and the third resource set is configured by the network side through the RRC signaling. Here, the third resource set includes multiple PUCCH resources. At least one of a time domain, a frequency domain and a code domain is different among different PUCCH resources, wherein configuration information of each PUCCH resource includes, but is not limited to: a frequency domain position, a symbol position (a starting symbol position, a symbol length) in a slot, sequence information, format, etc. The network side further dynamically indicates indication information of one or more PUCCH resources in the third resource set to the terminal through DCI. Here, the indication information of PUCCH resources may be index information of the PUCCH resources in the third resource set. After the terminal acquires the DCI, which PUCCH resources form the first resource set may be determined.

In another example, the configuration mode of the second resource set may be the same as that of the first resource set, which is configured jointly by a higher layer signaling and control information. Alternatively, the second resource set is configured directly by a higher layer signaling which includes configuration information of at least one resource. Alternatively, the second resource set is determined based on a position of a target time unit and a rule. The rule may be indicated by a higher signaling, for example, a higher layer signaling indicates that PUCCH resources in consecutive n time units (here, the time units can be slots, for example) after the target time unit are resources in the second resource set, so that it can be ensured that the terminal can constantly perform LBT in a relatively short time to obtain a transmission opportunity of PUCCH.

In an embodiment of the present disclosure, the number of resources contained in the second resource set is greater than or equal to the number of resources contained in the first resource set. In specific disclosures, when the transmission slot of PUCCH is outside the COT, a group of PUCCH resources are determined according to the combination of a DCI indication and a PUCCH resource set configured by a higher layer or only according to the PUCCH resource set configured by the higher layer, to ensure multiple transmission opportunities of PUCCH. When LBT fails for one of the PUCCH transmission opportunities, LBT may be performed at other PUCCH transmission opportunities. The multiple PUCCH transmission opportunities can increase the success probability of LBT, which ensures PUCCH transmission and reduces time delay. One group of PUCCH resources contains multiple PUCCH resources which are different in at least one of a time domain, a frequency domain and a code domain. For example, a group of PUCCH resources are configured through a higher layer signaling, including PUCCH resources on multiple slots that are continuous in time domain, which can ensure that the terminal can constantly perform LBT in a relatively short time to obtain a transmission opportunity of PUCCH.

FIG. 3 is a schematic flowchart of a method for configuring resources according to an embodiment of the present disclosure. As shown in FIG. 3, the method for configuring resources includes act 301.

In act 301, a base station configures a first resource set or a second resource set to a terminal, wherein the first resource set or the second resource set is used for determining, by the terminal, resources of a target channel according to a relationship between a target transmission time unit of the target channel and a first time period.

In an embodiment of the present disclosure, the base station may be a gNB in 5G or an eNB in 4G, and the type of the base station is not limited in an embodiment of the present disclosure.

In an embodiment of the present disclosure, the terminal may be any device that can communicate with a network, such as a mobile phone, a tablet computer, a vehicle-mounted terminal, or a wearable terminal.

In an embodiment of the present disclosure, the target channel is an uplink control channel (such as a PUCCH), which is used for carrying HARQ feedback information (such as HARQ-ACK information or HARQ-NACK information). For example, a base station transmits a PUSCH to a terminal, and if the terminal successfully receives the PUSCH, it will send HARQ-ACK information to the base station to notify the base station that the terminal successfully receives the PUSCH; and if the terminal does not receive the PUSCH successfully, it will send HARQ-NACK information to the base station to notify the base station that the terminal does not receive the PUSCH successfully, so that the base station retransmits the previous PUSCH to the terminal.

In an embodiment of the present disclosure, the target transmission time unit of the target channel refers to a planned transmission time unit of the target channel. The terminal determines the target transmission time unit of the target channel in the following way, i.e., the terminal obtains first control information including first indication information for indicating a time offset of the target transmission time unit of the target channel relative to a receiving time unit of a first channel; and the terminal determines the target transmission time unit of the target channel based on the receiving time unit of the first channel and the time offset, wherein the first channel is a downlink data channel.

In an embodiment of the present disclosure, the first time period refers to a COT that the terminal can use (i.e., occupy) currently, that is, the uplink transmission of the terminal in the first time period may be performed without LBT or only after one shot LBT. The first time period may be obtained in the following two manners.

In Manner 1, the first time period is COT obtained by a base station.

In Manner 2, the first time period is COT obtained by a terminal.

For example, before a base station transmits a PDSCH to a terminal, LBT needs to be performed. If LBT succeeds, COT is obtained for transmitting a PDSCH. The base station may perform downlink transmission in the COT. The base station may share the COT of the PDSCH with the terminal for uplink transmission. In this case, the uplink transmission of the terminal in the COT may be performed without LBT or only after one shot LBT.

In another example, before the terminal transmits a PDCCH, LBT needs to be performed. If LBT succeeds, COT is obtained for transmitting a PDCCH. The uplink transmission of the terminal in this COT may be performed without LBT or only after one shot LBT.

In an embodiment of the present disclosure, since the first time period refers to the COT that the terminal can use (i.e., occupy) currently, whether the target transmission time unit of the target channel is within the first time period leads to different success probabilities of the terminal in obtaining an uplink control channel, and it is needed to configure the transmission opportunities of the uplink control channel for two cases respectively.

In Case 1, if the target transmission time unit of the target channel is within the first time period, it is determined that resources of the target channel belong to the first resource set.

Here, that the target transmission time unit of the target channel is within the first time period includes: the target transmission time unit of the target channel belongs to the COT.

In Case 2, if the target transmission time unit of the target channel is outside the first time period, it is determined that resources of the target channel belong to the second resource set.

Here, that the target transmission time unit of the target channel is outside the first time period includes: the target transmission time unit of the target channel does not belong to the COT.

For the above Case 2, the target transmission time unit of the target channel may be in other COTs. Here, other COTs refer to the COTs that the terminal cannot use (i.e., occupy) currently, and may be the COTs obtained by performing LBT by other devices (terminals or network devices). Without being limited to this, the target transmission time unit of the target channel may alternatively be in a non-COT. Here, the non-COT refers to a COT that is not used (i.e., occupied) by any device.

In an embodiment of the present disclosure, if the target transmission time unit of the target channel belongs to the COT, the resources of the target channel belong to the first resource set. If the target transmission time unit of the target channel does not belong to the COT, the resources of the target channel belong to the second resource set. The number of resources contained in the second resource set is greater than or equal to the number of resources contained in the first resource set. That is, under the condition that the target transmission time unit of the target channel does not belong to the COT, there are more transmission opportunities of an uplink control channel, so that the probability of the terminal's successfully performing LBT on the uplink control channel can be increased.

In an embodiment of the present disclosure, the first resource set includes resources for transmitting the target channel in the target transmission time unit.

In an embodiment of the present disclosure, the second resource set is different from the first resource set, and the second resource set and the first resource set may have overlapping resources or may be completely different. Further, the second resource set may include resources for transmitting the target channel in the target transmission time unit, or may not include resources for transmitting the target channel in the target transmission time unit.

In an embodiment, the first resource set and the second resource set have at least one identical resource. The at least one identical resource includes a resource for transmitting the target channel in the target transmission time unit.

In an embodiment, the first resource set is configured by a first higher layer signaling and/or first control information, and the second resource set is configured by a second higher layer signaling and/or second control information.

For example, the first resource set is configured by a first higher layer signaling and first control information. The first higher layer signaling includes configuration information of a third resource set. The first control information includes indication information of at least one resource in the third resource set. The terminal determines the first resource set based on the first higher layer signaling and the first control information. Further, the third resource set is a resource set of an uplink control channel.

Here, the first higher layer signaling may be a RRC signaling, the first control information may be DCI, and the third resource set is configured by the network side through the RRC signaling. Here, the third resource set includes multiple PUCCH resources. At least one of a time domain, a frequency domain and a code domain is different among different PUCCH resources, wherein configuration information of each PUCCH resource includes, but is not limited to: a frequency domain position, a symbol position (a starting symbol position, a symbol length) in a slot, sequence information, format, etc. The network side further dynamically indicates indication information of one or more PUCCH resources in the third resource set to the terminal through DCI. Here, the indication information of PUCCH resources may be index information of the PUCCH resources in the third resource set. After the terminal acquires the DCI, which PUCCH resources form the first resource set may be determined.

In another example, the configuration mode of the second resource set may be the same as that of the first resource set, which is configured jointly by a higher layer signaling and control information. Alternatively, the second resource set is configured directly by a higher layer signaling which includes configuration information of at least one resource. Alternatively, the second resource set is determined based on a position of a target time unit and a rule. The rule may be indicated by a higher signaling, for example, a higher layer signaling indicates that PUCCH resources in consecutive n time units (here, the time units can be slots, for example) after the target time unit are resources in the second resource set, so that it can be ensured that the terminal can constantly perform LBT in a relatively short time to obtain a transmission opportunity of PUCCH.

FIG. 4 is a schematic diagram of a structure of an apparatus for determining resources according to an embodiment of the present disclosure. As shown in FIG. 4, the apparatus includes a first determining unit 401 and a second determining unit 402.

The first determining unit 401 is configured to determine a target transmission time unit of a target channel.

The second determining unit 402 is configured to determine resources of the target channel according to a relationship between the target transmission time unit of the target channel and a first time period.

In an embodiment, the second determining unit 402 is configured to determine that the resources of the target channel belong to a first resource set, if the target transmission time unit of the target channel is within the first time period; and determine that the resources of the target channel belong to a second resource set, if the target transmission time unit of the target channel is outside the first time period.

In an embodiment, the first time period is COT obtained by a base station; or the first time period is COT obtained by a terminal.

In an embodiment, that the target transmission time unit of the target channel is within the first time period includes: the target transmission time unit of the target channel belongs to the COT; and that the target transmission time unit of the target channel is outside the first time period includes: the target transmission time unit of the target channel does not belong to the COT.

In an embodiment, the number of resources contained in the second resource set is greater than or equal to the number of resources contained in the first resource set.

In an embodiment, the first resource set includes resources for transmitting the target channel in the target transmission time unit.

In an embodiment, the first resource set and the second resource set have at least one identical resource. Further, the at least one identical resource includes a resource for transmitting the target channel in the target transmission time unit.

In an embodiment, the first resource set is configured by a first higher layer signaling and/or first control information, and the second resource set is configured by a second higher layer signaling and/or second control information.

In an embodiment, the first resource set or the second resource set is a resource set of an uplink control channel.

In an embodiment, the apparatus further includes an acquiring unit 404.

The acquiring unit 404 is configured to acquire first control information, the first control information including first indication information for indicating a time offset of a target transmission time unit of the target channel relative to a receiving time unit of a first channel.

The first determining unit 401 is configured to determine the target transmission time unit of the target channel based on the receiving time unit of the first channel and the time offset. The first channel is a downlink data channel.

In an embodiment, the target channel is an uplink control channel.

Those skilled in the art should understand that the relevant description of the apparatus for determining resources of the embodiment of the present disclosure may be understood with reference to the relevant description of the method for determining resources of the embodiment of the present disclosure.

Figure 5:
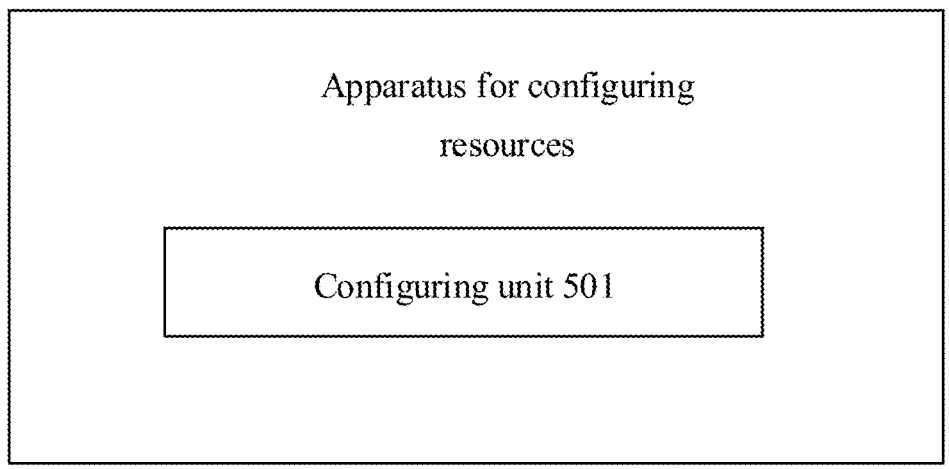
FIG. 5 is a schematic diagram of a structure of an apparatus for configuring resources according to an embodiment of the present disclosure.

FIG. 5 is a schematic diagram of a structure of an apparatus for configuring resources according to an embodiment of the present disclosure. As shown in FIG. 5, the apparatus includes a configuring unit 501.

The configuring unit 501 is configured to configure a first resource set or a second resource set to a terminal, wherein the first resource set or the second resource set is used for determining, by the terminal, resources of a target channel according to a relationship between a target transmission time unit of the target channel and a first time period.

In an embodiment, the number of resources contained in the second resource set is greater than or equal to the number of resources contained in the first resource set.

In an embodiment, the first resource set includes resources for transmitting the target channel in the target transmission time unit.

In an embodiment, the first resource set and the second resource set have at least one identical resource. Further, the at least one identical resource includes a resource for transmitting the target channel in the target transmission time unit.

In an embodiment, the first resource set is configured by a first higher layer signaling and/or first control information, and the second resource set is configured by a second higher layer signaling and/or second control information.

In an embodiment, the first resource set or the second resource set is a resource set of an uplink control channel.

Those skilled in the art should understand that the relevant description of the apparatus for configuring resources of the embodiment of the present disclosure may be understood with reference to the relevant description of the method for configuring resources of the embodiment of the present disclosure.

Figure 6:
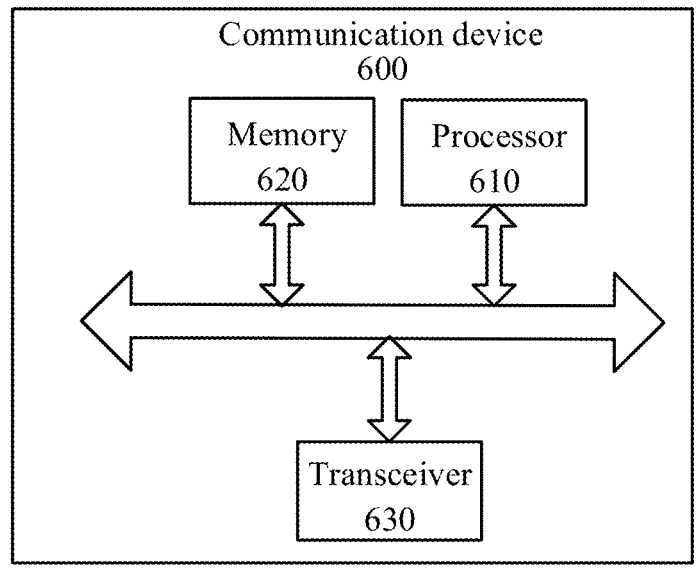
FIG. 6 is a schematic diagram of a structure of a communication device according to an embodiment of the present disclosure.

FIG. 6 is a schematic diagram of a structure of a communication device 600 according to an embodiment of the present disclosure. The communication device may be a terminal or a network device. The communication device 600 shown in FIG. 6 includes a processor 610 that can call and run a computer program from a memory to implement the methods in the embodiments of the present disclosure.

Optionally, as shown in FIG. 6, the communication device 600 may further include a memory 620. The processor 610 may call and run a computer program from the memory 620 to implement the methods in the embodiments of the present disclosure.

The memory 620 may be a separate device independent of the processor 610 or may be integrated in the processor 610.

Optionally, as shown in FIG. 6, the communication device 600 may further include a transceiver 630, and the processor 610 may control the transceiver 630 to communicate with other devices. Specifically, the transceiver 630 may send information or data to other devices or receive information or data sent by other devices.

The transceiver 630 may include a transmitter and a receiver. The transceiver 630 may further include antennas, and the number of antennas may be one or more.

Optionally, the communication device 600 may be specifically a network device of an embodiment of the present disclosure, and the communication device 600 may implement the corresponding flows implemented by the network device in various methods of the embodiments of the present disclosure, which will not be repeated here for brevity.

Optionally, the communication device 600 may be specifically a mobile terminal/terminal of an embodiment of the present disclosure, and the communication device 600 may implement the corresponding flows implemented by the mobile terminal/terminal in various methods of the embodiments of the present disclosure, which will not be repeated here for brevity.

Figure 7:
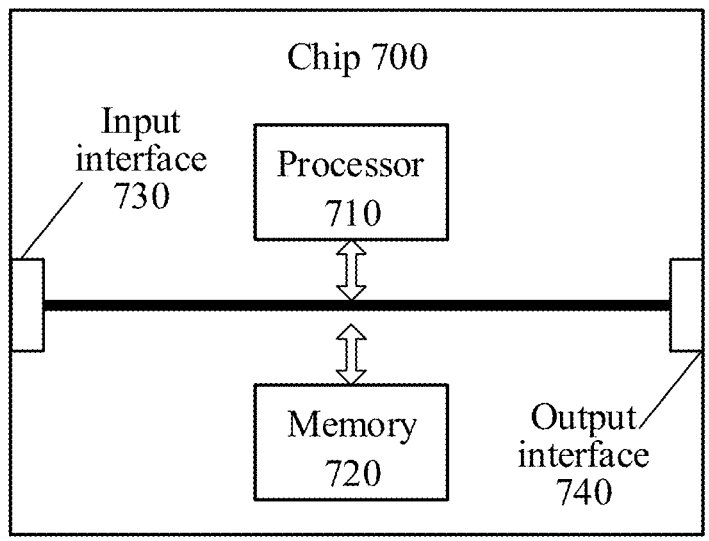
FIG. 7 is a schematic diagram of a structure of a chip according to an embodiment of the present disclosure.

FIG. 7 is a schematic diagram of a structure of a chip according to an embodiment of the present disclosure. A chip 700 shown in FIG. 7 includes a processor 710. The processor 710 may call and run a computer program from a memory to implement the methods in the embodiments of the present disclosure.

Optionally, as shown in FIG. 7, the chip 700 may further include a memory 720. The processor 710 may call and run a computer program from the memory 720 to implement the methods in the embodiments of the present disclosure.

The memory 720 may be a separate device independent of the processor 710 or may be integrated in the processor 710.

Optionally, the chip 700 may further include an input interface 730. The processor 710 may control the input interface 730 to communicate with other devices or chips, and specifically, may acquire information or data sent by other devices or chips.

Optionally, the chip 700 may further include an output interface 740. The processor 710 may control the output interface 740 to communicate with other devices or chips, and specifically, may output information or data to other devices or chips.

Optionally, the chip may be applied to a network device of an embodiment of the present disclosure, and the chip may implement corresponding flows implemented by the network device in various methods of the embodiments of the present disclosure, which will not be repeated here for brevity.

Optionally, the chip may be applied to a mobile terminal/terminal of an embodiment of the present disclosure, and the chip may implement corresponding flows implemented by the mobile terminal/terminal in various methods of the embodiments of the present disclosure, which will not be repeated here for brevity.

It should be understood that the chip mentioned in the embodiment of the present disclosure may also be referred to as a system-level chip, a system chip, a chip system or a system-on-chip, etc.

Figure 8:
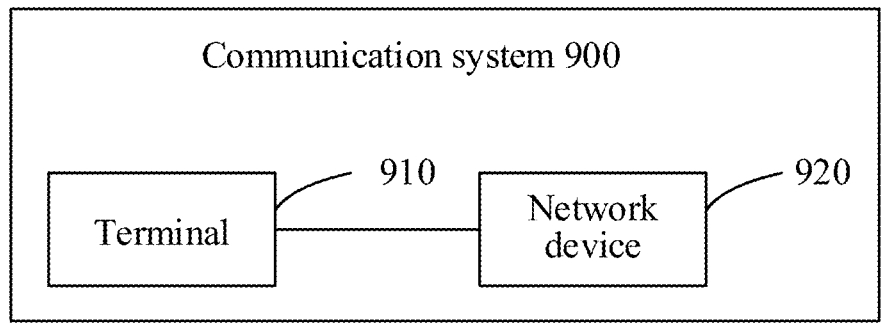
FIG. 8 is a schematic block diagram of a communication system according to an embodiment of the present disclosure.

FIG. 8 is a schematic block diagram of a communication system 900 according to an embodiment of the present disclosure. As shown in FIG. 8, the communication system 900 includes a terminal 910 and a network device 920.

Herein, the terminal 910 may be configured to implement corresponding functions implemented by the terminal in the above-mentioned methods, and the network device 920 may be configured to implement corresponding functions implemented by the network device in the above-mentioned methods, which will not be repeated here for brevity.

It should be understood that the processor in the embodiment of this disclosure may be an integrated circuit chip having a signal processing capability. In an implementation process, the steps of the foregoing method embodiments may be implemented by an integrated logic circuit of hardware in the processor or instructions in a form of software. The processor may be a general purpose processor, a Digital Signal Processor (DSP), an Disclosure Specific Integrated Circuit (ASIC), a Field Programmable Gate Array (FPGA) or another programmable logic device, a discrete gate or a transistor logic device, or a discrete hardware component. The processor may implement or execute methods, acts and logical block diagrams disclosed in the embodiments of this disclosure. The general purpose processor may be a microprocessor, or the processor may be any conventional processor or the like. The acts of the methods disclosed with reference to the embodiments of this disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in a memory, and the processor reads the information in the memory and completes the acts of the above methods in combination with its hardware.

It may be understood that the memory in the embodiment of this disclosure may be a transitory memory or a non-transitory memory, or may include both a transitory memory and a non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. By way of exemplary but not restrictive illustrations, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the systems and methods described here is intended to include, but not limited to, these and any other suitable types of memory.

It should be understood that the foregoing memory is an example for illustration, but not for limiting. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM), or the like. That is, memories in the embodiments of the present disclosure are intended to include, but not limited to, these and any other suitable types of memories.

An embodiment of the present disclosure further provides a computer readable storage medium for storing a computer program.

Optionally, the computer readable storage medium may be applied to a network device of an embodiment of the present disclosure, and the computer program causes a computer to perform corresponding flows implemented by the network device in various methods of the embodiments of the present disclosure, which will not be repeated here for brevity.

Optionally, the computer readable storage medium may be applied to a mobile terminal/terminal of an embodiment of the present disclosure, and the computer program causes a computer to perform corresponding flows implemented by the mobile terminal/terminal in various methods of the embodiments of the present disclosure, which will not be repeated here for brevity.

An embodiment of the present disclosure also provides a computer program product including computer program instructions.

Optionally, the computer program product may be applied to a network device of an embodiment of the present disclosure, and the computer program instructions cause a computer to perform corresponding flows implemented by the network device in various methods of the embodiments of the present disclosure, which will not be repeated here for brevity.

Optionally, the computer program product may be applied to a mobile terminal/terminal of an embodiment of the present disclosure, and the computer program instructions cause a computer to perform corresponding flows implemented by the mobile terminal/terminal in various methods of the embodiments of the present disclosure, which will not be repeated here for brevity.

An embodiment of the present disclosure also provides a computer program.

Optionally, the computer program may be applied to a network device of an embodiment of the present disclosure. When running on a computer, the computer program causes the computer to execute corresponding processes implemented by the network device in various methods of the embodiments of the present disclosure, which will not be repeated here for brevity.

Optionally, the computer program may be applied to a mobile terminal/terminal of an embodiment of the present disclosure. When running on a computer, the computer program causes the computer to execute corresponding processes implemented by the mobile terminal/terminal in various methods of the embodiments of the present disclosure, which will not be repeated here for brevity.

Those of ordinary skills in the art may recognize that the exemplary units and algorithm steps described in combination with the embodiments disclosed herein may be implemented in electronic hardware, or a combination of computer software and electronic hardware. Whether these functions are implemented in hardware or software depends on the specific disclosure and design constraints of the technical solutions. Skilled artisans may use different methods to implement the described functions in respect to each particular disclosure, but such implementation should not be considered to be beyond the scope of the present disclosure.

Those skilled in the art may clearly understand that for convenience and conciseness of description, as to the specific working processes of the systems, apparatuses and units described above, reference may be made to the corresponding processes in the method embodiments, which will not be repeated here.

In several embodiments provided by the present disclosure, it should be understood that the disclosed systems, apparatuses and methods may be implemented in other ways. For example, the apparatus embodiments described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the objects of the solutions of the embodiments.

In addition, various functional units in various embodiments of the present disclosure may be integrated in one processing unit, or the various units may be physically present separately, or two or more units may be integrated in one unit.

The functions may be stored in a computer readable storage medium if implemented in a form of software functional units and sold or used as a separate product.

Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, a network device, or the like) to perform all or part of the acts of the methods described in various embodiments of the present disclosure. The foregoing storage medium includes various mediums capable of storing program codes, such as a USB flash disk, a removable hard disk, a Read-Only Memory (ROM), a Random Access Memory (RAM), a magnetic disk, or an optical disk.

What are described above are merely exemplary embodiments of the present disclosure, but the protection scope of the present disclosure is not limited thereto. Any variation or substitution that may be easily conceived by any person familiar with the art within the technical scope disclosed by the present disclosure shall be included within the protection scope of the present disclosure. Therefore, the protection scope of the present disclosure shall be determined by the protection scope of the claims.

What I claim is:

1. A method for determining resources, comprising:
   determining, by a terminal, a target transmission time unit of a target channel;
   when the terminal determines that the target transmission time unit of the target channel is within a first time period, the method further comprises:
   determining, by the terminal, to use a first resource set to transmit the target channel, and
   transmitting, by the terminal, the target channel by using the first resource set; and
   when the terminal determines that the target transmission time unit of the target channel is outside the first time period, the method further comprises:
   determining, by the terminal, to use a second resource set to transmit the target channel, and
   transmitting, by the terminal, the target channel by using the second resource set;
   wherein determining, by the terminal, the target transmission time unit of the target channel comprises:
   obtaining, by the terminal, first control information comprising first indication information, wherein the first indication information indicates a time offset of the target transmission time unit of the target channel relative to a receiving time unit of a first channel; and
   determining, by the terminal, the target transmission time unit of the target channel only based on two parameters, wherein the two parameters consist of the receiving time unit of the first channel and the time offset of the target transmission time unit of the target channel relative to the receiving time unit of the first channel,
   wherein the first channel is a downlink data channel.

2. The method according to claim 1, wherein the first resource set comprises resources for transmitting the target channel in the target transmission time unit.

3. The method according to claim 1, wherein the first resource set is configured by a first higher layer signaling and/or first control information, and the second resource set is configured by a second higher layer signaling and/or second control information.

4. The method according to claim 1, wherein a quantity of resources contained in the second resource set is greater than a quantity of resources contained in the first resource set.

5. The method of claim 1, wherein:
   the first time period is a Channel Occupation Time (COT);
   the target transmission time unit of the target channel being within the first time period is: the target transmission time unit of the target channel being within the COT;
   the target transmission time unit of the target channel being outside the first time period is: the target transmission time unit of the target channel being outside the COT; and
   the first time period is the COT obtained by the base station.

6. A method for configuring resources, comprising:
   configuring, by a base station, a first resource set or a second resource set for a terminal, when the terminal determines that a target transmission time unit of the target channel is within a first time period, the first resource set is configured to enable the terminal to:
   determine to use the first resource set to transmit a target channel; and
   transmit the target channel by using the first resource set; and
   when the terminal determines that a target transmission time unit of the target channel is outside the first time period,
   the second resource set is configured to enable the terminal to: determine to use a second resource set to transmit the target channel; and
   transmit the target channel by using the second resource set,
   wherein the first resource set is configured by a first higher layer signaling and/or first control information, and the second resource set is configured by a second higher layer signaling and/or second control information:
   wherein the first control information comprises first indication information, wherein the first indication information indicates a time offset of the target transmission time unit of the target channel relative to a receiving time unit of a first channel; and the terminal determines the target transmission time unit of the target channel only based on two parameters, wherein the two parameters consist of the receiving time unit of the first channel and the time offset of the target transmission time unit of the target channel relative to the receiving time unit of the first channel; and wherein the first channel is a downlink data channel.

7. The method according to claim 6, wherein the first resource set comprises resources for transmitting the target channel in the target transmission time unit.

8. The method according to claim 6, wherein a quantity of resources contained in the second resource set is greater than a quantity of resources contained in the first resource set.

9. The method of claim 6, wherein:
   the first time period is a Channel Occupation Time (COT);
   the target transmission time unit of the target channel being within the first time period is: the target transmission time unit of the target channel being within the COT;
   the target transmission time unit of the target channel being outside the first time period is: the target transmission time unit of the target channel being outside the COT; and
   the first time period is the COT obtained by the base station.

10. A terminal, comprising a processor and a memory, the memory being used for storing a computer program, and the processor is configured to call and run the computer program stored in the memory to implement:

determining a target transmission time unit of a target channel;

when the terminal determines that the target transmission time unit of the target channel is within a first time period, the processor is further configured to call and run the computer program stored in the memory to implement:

determining to use a first resource set to transmit the target channel, and transmitting the target channel by using the first resource set; and when the terminal determines that the target transmission time unit of the target channel is outside the first time period, the processor is further configured to call and run the computer program stored in the memory to implement:

determining to use a second resource set to transmit the target channel; and transmitting the target channel by using the second resource set, wherein the processor is configured to further implement:

acquiring first control information, the first control information comprising first indication information, wherein the first indication information indicates a time offset of the target transmission time unit of the target channel relative to a receiving time unit of a first channel; and determining the target transmission time unit of the target channel only based on two parameters, wherein the two parameters consist of the receiving time unit of the first channel and the time offset of the target transmission time unit of the target channel relative to the receiving time unit of the first channel, wherein the first channel is a downlink data channel.

11. The terminal according to claim 10, wherein the first resource set comprises resources for transmitting the target channel in the target transmission time unit.

12. The terminal according to claim 10, wherein the first resource set is configured by a first higher layer signaling and/or first control information, and the second resource set is configured by a second higher layer signaling and/or second control information.

13. The terminal according to claim 10, wherein a quantity of resources contained in the second resource set is greater than a quantity of resources contained in the first resource set.

14. The terminal device of claim 10, wherein:

the first time period is a Channel Occupation Time (COT);

the target transmission time unit of the target channel being within the first time period is: the target transmission time unit of the target channel being within the COT;

the target transmission time unit of the target channel being outside the first time period is: the target transmission time unit of the target channel being outside the COT; and the first time period is the COT obtained by the base station.

15. A network device, comprising a processor and a memory, the memory being used for storing a computer program, and the processor is configured to call and run the computer program stored in the memory to implement:

configuring a first resource set or a second resource set for a terminal, when the terminal determines that a target transmission time unit of the target channel is within a first time period, the first resource set is configured to enable the terminal to:

determine to use a first resource set to transmit a target channel; and transmit the target channel by using the first resource set; and when the terminal determines that the target transmission time unit of the target channel is outside the first time period, the second resource set is configured to enable the terminal to:

determine to use a second resource set to transmit the target channel; and transmit the target channel by using the second resource set, wherein the first resource set is configured by a first higher layer signaling and/or first control information, and the second resource set is configured by a second higher layer signaling and/or second control information:

wherein the first control information comprises first indication information, wherein the first indication information indicates a time offset of the target transmission time unit of the target channel relative to a receiving time unit of a first channel; and the terminal determines the target transmission time unit of the target channel only based on two parameters, wherein the two parameters consist of the receiving time unit of the first channel and the time offset of the target transmission time unit of the target channel relative to the receiving time unit of the first channel; and wherein the first channel is a downlink data channel.

16. The network device according to claim 15, wherein the first resource set comprises resources for transmitting the target channel in the target transmission time unit.

17. The network device according to claim 15, wherein a quantity of resources contained in the second resource set is greater than a quantity of resources contained in the first resource set.

18. The network device of claim 15, wherein:

the first time period is a Channel Occupation Time (COT);

the target transmission time unit of the target channel being within the first time period is: the target transmission time unit of the target channel being within the COT;

the target transmission time unit of the target channel being outside the first time period is: the target transmission time unit of the target channel being outside the COT; and the first time period is the COT obtained by the base station.

* * * * *